(12) United States Patent
Yoshii et al.

(10) Patent No.: US 6,606,139 B2
(45) Date of Patent: Aug. 12, 2003

(54) LIQUID CRYSTAL DISPLAY DEVICE WITH IMPROVED VIEWING ANGLE PROPERTY AND PORTABLE ELECTRONIC APPARATUS USING THE SAME

(75) Inventors: Katsumasa Yoshii, Fukushima-ken (JP); Tatsuya Moriike, Fukushima-ken (JP); Mitsuru Kano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/126,940

(22) Filed: Apr. 18, 2002

(65) Prior Publication Data

US 2003/0011730 A1 Jan. 16, 2003

(30) Foreign Application Priority Data

Apr. 19, 2001 (JP) ........................................ 2001-121206

(51) Int. Cl.[7] ............................................. G02F 1/1335
(52) U.S. Cl. ....................... 349/114; 349/113; 349/117; 349/96
(58) Field of Search ................................ 349/113, 114, 349/117, 96, 99, 121, 187

(56) References Cited

U.S. PATENT DOCUMENTS

| | | | |
|---|---|---|---|
| 6,130,736 A | * 10/2000 | Sasaki et al. | 349/122 |
| 6,219,122 B1 | 4/2001 | Uchida et al. | 349/117 |
| 6,429,919 B1 | * 8/2002 | Takatsuka et al. | 349/113 |
| 6,476,890 B1 | * 11/2002 | Funahata et al. | 349/113 |
| 2001/0055082 A1 | * 12/2001 | Kubo et al. | 349/114 |

* cited by examiner

Primary Examiner—Tarifur R. Chowdhury
(74) Attorney, Agent, or Firm—Brinks Hofer Gilson & Lione

(57) ABSTRACT

A liquid crystal display device includes a reflector disposed at an outside surface side of one substrate of a liquid crystal cell or between the first substrate and an electrode disposed on an inside surface side of the first substrate. When an angle between a direction of a normal line with respect to a display surface of the liquid crystal display device and a main viewing direction is from about 0 degrees to about 20 degrees, a reflection ratio peak value of light incident upon the liquid crystal display device and reflected by the reflector is set so as to occur within a range of about 20 degrees from the normal line direction.

29 Claims, 10 Drawing Sheets

LIQUID CRYSTAL DISPLAY DEVICE WITH IMPROVED VIEWING ANGLE PROPERTY AND PORTABLE ELECTRONIC APPARATUS USING THE SAME

BACKGROUND OF THE INVENTION

1. Field of the Invention

The present invention relates to a liquid crystal display device including a reflector, and a portable electronic apparatus. More particularly, the present invention relates to a liquid crystal display device which has a viewing angle property that allows a display to appear brighter when a viewer looks at the display from a direction close to a direction of a normal line with respect to a display surface of the liquid crystal display device than when the viewer looks at the display from other viewing angles; and a portable electronic apparatus including at its display section the liquid crystal display device with such a viewing angle property.

2. Description of the Related Art

In general, liquid crystal display devices are called semi-transmissive liquid crystal display devices or transmissive liquid crystal display devices, which include backlights, or reflective liquid crystal display devices, depending upon the form of display of the liquid crystal display devices. To display images, reflective liquid crystal display devices use only outside light, such as sunlight or light from indoor illumination sources, and, thus, do not use a backlight. Reflective liquid crystal display devices are frequently used in, for example, portable information terminals that are under constant stress to be made thinner and lighter and to have decreasing power consumption.

When semi-transmissive liquid crystal display devices are in an environment that does not provided sufficient outside light, a backlight is turned on for operation in a transmission mode. On the other hand, when semi-transmissive liquid crystal display devices are in an environment that provides sufficient outside light, the backlight is not turned on, so that they operate in a reflection mode thereby saving power. Semi-transmissive liquid crystal display devices are frequently used in portable electronic apparatuses, such as cellular phones or notebook-size personal computers (PC).

FIG. 12 is a sectional view of an example of a related transflective liquid crystal display device.

In the general structure of the transflective liquid crystal display device, a reflection mode STN (super-twisted nematic) liquid crystal cell 72, a forward scattering plate 90, an upper retardation plate 73b, and an upper polarizing plate 74 are placed upon each other on a lower retardation plate 73a of a reflective plate 71 in that order from the side of the lower retardation plate 73a; and a backlight 95, serving as a light source, is provided below the reflective plate 71. The reflective plate 71 has a lower polarizing plate 70 and the lower retardation plate 73a provided thereat.

In the general structure of the liquid crystal cell 72, a lower glass substrate 75, a color filter 76, a lower transparent electrode layer 78, a lower alignment film 79, an upper alignment film 80 disposed so as to be separated from and to oppose the lower alignment film 79, an upper transparent electrode layer 81, and an upper glass substrate 82 are placed upon each other in that order from the side of the lower polarizing plate 70. A super-twisted nematic liquid crystal layer 83 is disposed between the lower and upper alignment films 79 and 80. An overcoat layer (not shown), formed of silica or acrylic resin, is provided between the color filter 76 and the lower transparent electrode layer 78.

The reflective plate 71 has an Al film whose surface is in a specular state, and has holes 71a for passing light from the backlight 95 when the backlight 95 is used.

The retardation plates 73a and 73b are provided to prevent coloring of the display into blue or yellow by compensating for phase differences of light that passes through the STN liquid crystals.

The forward scattering plate 90 is causes the incident light to be reflected not only in a specular reflection direction by the surface of the reflective plate 71, but also in a direction close to the specular reflection direction by the surface of the reflector 71. The forward scattering plate 90 achieves this by scattering light (outside light) passing through the upper polarizing plate 74 and the upper retardation plate 73b and incident upon the forward scattering plate 90 towards the liquid crystal cell 72.

FIG. 13 illustrates another example of a related transflective liquid crystal display device.

In the general structure of the transflective liquid crystal display device, a first retardation plate 173a, a second retardation plate 173b, and a polarizing plate 174 are placed upon each other on a reflection mode STN (super-twisted nematic) liquid crystal cell 172 in that order from the side of an upper glass substrate 182; and a backlight 195, serving as a light source, is provided below the liquid crystal cell 172.

In the general structure of the liquid crystal cell 172, a lower glass substrate 175, a reflector 171, an overcoat layer 171c, a color filter 176, an overcoat layer 177a, a lower transparent electrode layer 178, a lower alignment film 179, an upper alignment film 180 disposed so as to be separated from and to oppose the lower alignment film 179, a topcoat layer 177b, an upper transparent electrode layer 181, and an upper glass substrate 182 are placed upon each other in that order.

Many minute bumpy portions (recesses 171e in FIG. 13) are formed adjacent each other in an irregular manner at a reflective surface of the reflector 171. The bumpy portions can be formed by, for example, conventional photolithography methods. In one such method, a surface of a resin base material 171a, such as a photosensitive resin layer, is irradiated with light through a mask pattern, the exposed resin is developed to form many minute adjacent spherical recesses, and the surface of the resin base material 171a having the spherical recesses is subjected to evaporation or plating using, for example, aluminum or silver in order to form a metallic film 171b having the bumpy portions (the recesses 171e).

The metallic film 171b can be made thin (to a thickness of the order of 30 nm) so that light from the backlight 195 can pass therethrough when the transflective liquid crystal display device is in a transmission mode.

The inside surfaces of the recesses 171e are spherical, and have an inclination angle distribution in a range of from −20 degrees to +20 degrees and a depth within a range of from 0.1 $\mu$m to 3 $\mu$m. Distances between the recesses 171e are set so that pitches between adjacent recesses (center-to-center distance) differ within a range of from 5 $\mu$m to 50 $\mu$m.

To achieve satisfactory display performance of a liquid crystal display device, it is ordinarily necessary for factors such as (1) resolution, (2) contrast, (3) brightness of a screen, (4) brightness of color, and (5) visibility (viewing angle wideness) to be satisfactory.

As shown in FIG. 14, a liquid crystal display device which is incorporated in an apparatus which is used with its display surface inclined, such as a portable information terminal including a cellular phone or a notebook-size personal computer, is frequently viewed from a direction close to a normal line direction P with respect to the display surface. More particularly, the information terminal is frequently viewed from a direction within a range of about 10 degrees from the normal line direction P. In general, an angle θ between a main viewing direction α when a viewer (user) views the display surface (screen) and the normal line direction P is frequently within a range of from about 0 degrees to about 20 degrees.

FIG. 14 illustrates a state in which a cellular phone including a display section 100 which comprises a liquid crystal display device and which is provided in a body 105 is being used. In FIG. 14, reference character P denotes the normal line with respect to the display surface of the display section 100, reference character Q denotes incident light, and reference character $\omega_o$ denotes an incidence angle (such as about 30 degrees) of the incident light from the normal line. Reference character $R_1$ denotes reflected light (specularly reflected light) when the incidence angle $\omega_o$ and a reflection angle $\omega_o$ are equal from the normal line, reference character $R_2$ denotes reflected light when the reflection angle ω is smaller than the incidence angle $\omega_o$ from the normal line, and reference character $R_3$ denotes reflected light when the reflection angle $\omega_o$ is greater than the incidence angle $\omega_o$ from the normal line.

As can be seen from FIG. 14, a viewing point Ob of the viewer is concentrated ordinarily in the reflected-light-$R_2$ direction close to the normal line direction P, specifically, in a direction within a range of up to about 10 degrees from the normal line direction P. In contrast, the reflected light beams $R_1$ and $R_3$ are such as to cause the viewer to look at the display surface from the lower side to the upper side, thereby making it difficult for the viewer to see what is displayed on the display surface. Therefore, it is desirable to provide a wide viewing angle and, at the same time, to increase the reflection ratio of the liquid crystal display device in a direction where the reflection angle is smaller than a specular reflection angle.

However, when the related liquid crystal display device shown in FIG. 12 is in a reflection mode, the range in which incident light is reflected is wider than that of a liquid crystal display device of the type that does not include a forward scattering plate, but most of the incident light is reflected in the specular reflection direction and in directions near the specular reflection direction (reflection ratio peak value occurs at a specular reflection angle or at angles close to the specular reflection angle). Therefore, when the viewer views the display section from the specular reflection direction and in directions close to the specular reflection direction, what is displayed on the display section appears bright. However, when the viewer views it from other directions, what is displayed on the display section appears dark.

In the related liquid crystal display device shown in FIG. 13, a large portion of the incident light is reflected in the specular reflection direction and in directions close to the specular reflection direction (peak value of the reflection ratio occurs at the specular reflection angle or at angles that are slightly greater than or less than the specular reflection angle). Therefore, when the viewer views the display section from the specular reflection direction and from directions close to the specular reflection direction, what is displayed on the display section appears bright. However, when the viewer views it from other directions, what is displayed on the display section appears dark.

Accordingly, since, as mentioned above, the viewing point of the viewer is ordinarily concentrated in directions close to the normal line direction P when the display surface of, for example, a cellular phone including any one of the related transflective display devices at the display section is viewed, the display appears dark. When the viewer tries to view the display so that it appears bright, the viewer must view the display from the specular reflection direction or directions close to the specular reflection direction, in which case, as mentioned above, the viewer views the display surface upward from the lower side to the upper side, thereby making it difficult to see what is displayed on the display section. Thus, typical users require not only a broader range of viewing angles (with sufficient brightness), but also increased brightness specifically at a range of typically used viewing angles (relatively close to the normal line of the display) than that provided from conventional displays.

SUMMARY OF THE INVENTION

The present invention has been achieved to overcome the above-described problems. It is a first object of the present invention to provide a liquid crystal display device which has a viewing angle property that allows a display to appear brighter when a viewer looks at a display surface of the liquid crystal display device from a direction close to a direction of a normal line with respect to the display surface than when the viewer looks at the display surface from other viewing angles.

It is a second object of the present invention to provide a portable electronic apparatus, such as portable electronic terminals including a cellular phone or a notebook-size personal computer, including at its display section the liquid crystal display device having a property such as that mentioned above.

To achieve the first object, according to a first aspect of the present invention, there is provided a liquid crystal display device including a reflector disposed at an outside surface side of a first substrate of a liquid crystal cell or between the first substrate and an electrode disposed at an inside surface side of the first substrate. The liquid crystal cell is formed by providing the electrode and an alignment film at the inside surface side of the first substrate in that order from a side of the first substrate and by providing an electrode and an alignment layer at an inside surface side of a second substrate in that order from a side of the second substrate, with the first substrate and the second substrate opposing each other so as to sandwich a liquid crystal layer. In the liquid crystal display device, a retardation plate and a polarizing plate are provided at an outside surface side of the second substrate in that order from the side of the second substrate. When an angle between a direction of a normal line with respect to a display surface of the liquid crystal display device and a main viewing direction is from 0 degrees to about 20 degrees, a reflection ratio peak value of light incident upon the liquid crystal display device and reflected by the reflector is set so as to occur within a range of about 30 degrees from the normal line direction.

According to the liquid crystal display device of the present invention having such a structure, the amount of light reflected within the range of about 30 degrees from the direction of the normal line with respect to the display surface of the liquid crystal display device becomes large, so that distribution of the amount of reflected light in directions close to a viewing point of a viewer becomes large. At a practical viewing point, particularly at angles of 0 to about 20 degrees between the normal line direction and the main viewing direction, the liquid crystal display device can provide a bright display (screen).

When the structure of the first aspect is used, the reflection ratio peak value of the light incident upon the liquid crystal display device and reflected by the reflector may be set so as to occur within a range of about 20 degrees from the normal line direction.

According to the liquid crystal display device of the present invention having such a structure, the amount of light reflected within the range of about 20 degrees from the direction of the normal line with respect to the display surface of the liquid crystal display device becomes large, so that the distribution of the amount of reflected light in directions close to the viewing point of the viewer becomes large, as a result of which an area where the amount of reflected light is large is widened. At a practical viewing point, particularly at angles of 0 to about 20 degrees between the normal line direction and the main viewing direction, the liquid crystal display device can provide a bright display (screen).

When the structure of the first aspect is used, the reflector may include a plurality of recesses with light reflectivity formed in a surface of a base material or a metallic film formed on the base material. Here, the recesses have inside surfaces which form parts of spherical surfaces, and have an inclination angle distribution in a range of from −about 30 degrees to +about 30 degrees. The recesses are formed irregularly so as to have depths within a range of from 0.1 $\mu$m to 3 $\mu$m. The recesses are disposed irregularly so that pitches between adjacent recesses are in a range of from 5 $\mu$m to 50 $\mu$m.

The liquid crystal display device may have a reflection ratio peak value substantially constant between a range of about 10 degrees to about 50 degrees or about 20 degrees to about 40 degrees from the normal line direction. The reflection ratio peak value may be substantially constant over a range of not less than about 10 degrees.

To achieve the first object, according to a second aspect of the present invention, there is provided a liquid crystal display device including a reflector disposed at an outside surface side of a first substrate of a liquid crystal cell or between the first substrate and an electrode disposed at an inside surface side of the first substrate. The liquid crystal cell is formed by providing the electrode and an alignment film at the inside surface side of the first substrate in that order from a side of the first substrate and by providing an electrode and an alignment layer at an inside surface side of a second substrate in that order from a side of the second substrate, with the first substrate and the second substrate opposing each other so as to sandwich a liquid crystal layer. In the liquid crystal display device, a retardation plate and a polarizing plate are provided at an outside surface side of the second substrate in that order from the side of the second substrate. When an angle between a direction of a normal line with respect to a display surface of the liquid crystal display device and a main viewing direction is from 0 degrees to about 20 degrees, a reflection ratio peak value of light incident upon the liquid crystal display device and reflected by the reflector is set so as to occur within a range of angles less than about 30 degrees from the normal line direction.

According to the liquid crystal display device having such a structure, the amount of light reflected within the range of angles less than about 30 degrees from the direction of the normal line with respect to the display surface of the liquid crystal display device becomes large, so that distribution of the amount of reflected light in directions close to a viewing point of a viewer becomes large. At a practical viewing point, particularly at angles of 0 to about 20 degrees between the normal line direction and the main viewing direction, the liquid crystal display device can provide a bright display (screen).

When the structure of the second aspect is used, the reflection ratio peak value of the light incident upon the liquid crystal display device and reflected by the reflector may be set so as to occur within a range of about 20 degrees from the normal line direction.

According to the liquid crystal display device of the present invention having such a structure, the amount of light reflected within the range of about 20 degrees from the direction of the normal line with respect to the display surface of the liquid crystal display device becomes large, so that the distribution of the amount of reflected light in directions close to the viewing point of the viewer becomes large, as a result of which an area where the amount of reflected light is large is widened. At a practical viewing point, particularly at angles of 0 to about 20 degrees between the normal line direction and the main viewing direction, the liquid crystal display device can provide a bright display (screen).

When the structure of the second aspect is used, the reflector may include a plurality of recesses with light reflectivity formed in a surface of a base material or a metallic film formed on the base material. Here, each of the recesses is formed so that an inclination angle (absolute value of an angle between the base material surface and a tangential plane at any point on a curvature) at each one of a corresponding side portion becomes a maximum. The recesses are formed irregularly so as to have depths within a range of from 0.1 $\mu$m to 3 $\mu$m. The recesses are irregularly disposed so that pitches between adjacent recesses are in a range of from 5 $\mu$m to 50 $\mu$m.

When the structure of the first aspect is used, a thickness of a metallic film when the reflector includes a base material and the metallic film having a plurality of recesses and formed on the base material may be in a range of from 8 nm to 20 nm. Therefore, the metallic film becomes thin, so that transmittancy with respect to light from a backlight disposed below the reflector can be increased, thereby making it possible to use the liquid crystal display device as a transflective liquid crystal display device exhibiting excellent properties when light is reflected and when light is transmitted. When the reflector is formed of a base material having a plurality of recesses, the thickness of the base material is made to lie within the range of from 8 nm to 20 nm, so that the base material becomes thin, and, thus, the transmittancy with respect to the light from the backlight disposed below the reflector can be increased. Therefore, it is possible to use the liquid crystal display device as a transflective liquid crystal display device exhibiting excellent properties when light is reflected and when light is transmitted.

To achieve the second object, according to a third aspect of the present invention, there is provided a portable electronic apparatus including at a display section thereof the liquid crystal display device having the structure of the first aspect.

When such a portable electronic apparatus of the present invention having such a structure is used, a portable electronic apparatus, such as a cellular phone or a notebook-size personal computer, having a display surface (screen) with excellent visibility in a reflection mode of operation or in either the reflection mode or a transmission mode of operation can be provided.

The liquid crystal display device may have a reflection ratio peak value substantially constant between a range of about 20 degrees to about 30 degrees or about 10 degrees to about 25 degrees from the normal line direction. A center of the reflection ratio peak value area may be approximately 25 degrees or approximately 15 degrees.

The reflector may include a plurality of aspherical recesses with light reflectivity formed in a surface of a base material or a metallic film formed on the base material. Each of the recesses may have a maximum inclination angle (an absolute value of an angle between a surface of the base material and a tangential plane at any point on a curvature) that differ irregularly and have values within a range of from about 2 degrees to about 90 degrees, may be formed irregularly and have depths (a distance between a minimum point of each recess and the surface of the base material) within a range of from about 0.1 μm to about 3 μm, and may be disposed irregularly such that pitches between adjacent recesses are in a range of from about 5 μm to about 50 μm. The maximum inclination angles of a majority of the recesses may have values within a range of from about 4 degrees to about 35 degrees. The recesses may have a single minimum point.

The liquid crystal display device may have a reflection ratio peak value substantially constant over a range of not less than about 10 degrees.

Another embodiment that achieves the above objectives is a method of improving viewing of a liquid crystal display device having a reflector and a display surface. The method comprises setting a reflection ratio peak value of light incident upon the liquid crystal display device and reflected by the reflector to occur within a range of less than about 20 degrees from a direction of a normal line with respect to the display surface when an angle between the normal line direction and a main viewing direction of the display surface is about 0 degrees to about 20 degrees and broadening the reflection ratio peak value to be substantially constant over a range of not less than about 10 degrees.

The method may further comprise providing a plurality of asymmetric recesses in the reflector. The method may further comprise providing a thickness of material in which the recesses are formed in a range of from about 8 nm to about 20 nm. Further, the method may further comprise providing recesses: that have a maximum inclination angle (an absolute value of an angle between a surface of material in which the recesses are formed and a tangential plane at any point on a curvature) that differs irregularly and has a value within a range of from about 2 degrees to about 90 degrees, that are formed irregularly and have depths (a distance between a minimum point of each recess and the surface of the base material) within a range of from about 0.1 μm to about 3 μm, and that are disposed irregularly such that pitches between adjacent recesses are in a range of from about 5 μm to about 50 μm.

In addition, the method may further comprise providing recesses in which the maximum inclination angles of a majority of the recesses have values within a range of from about 4 degrees to about 35 degrees or providing recesses that have a single minimum point.

DESCRIPTION OF THE PREFERRED EMBODIMENTS

Hereunder, a description of embodiments of the present invention will be given with reference to the relevant drawings. However, the present invention is not limited to the embodiments described below.

[First Embodiment]

Figure 1:
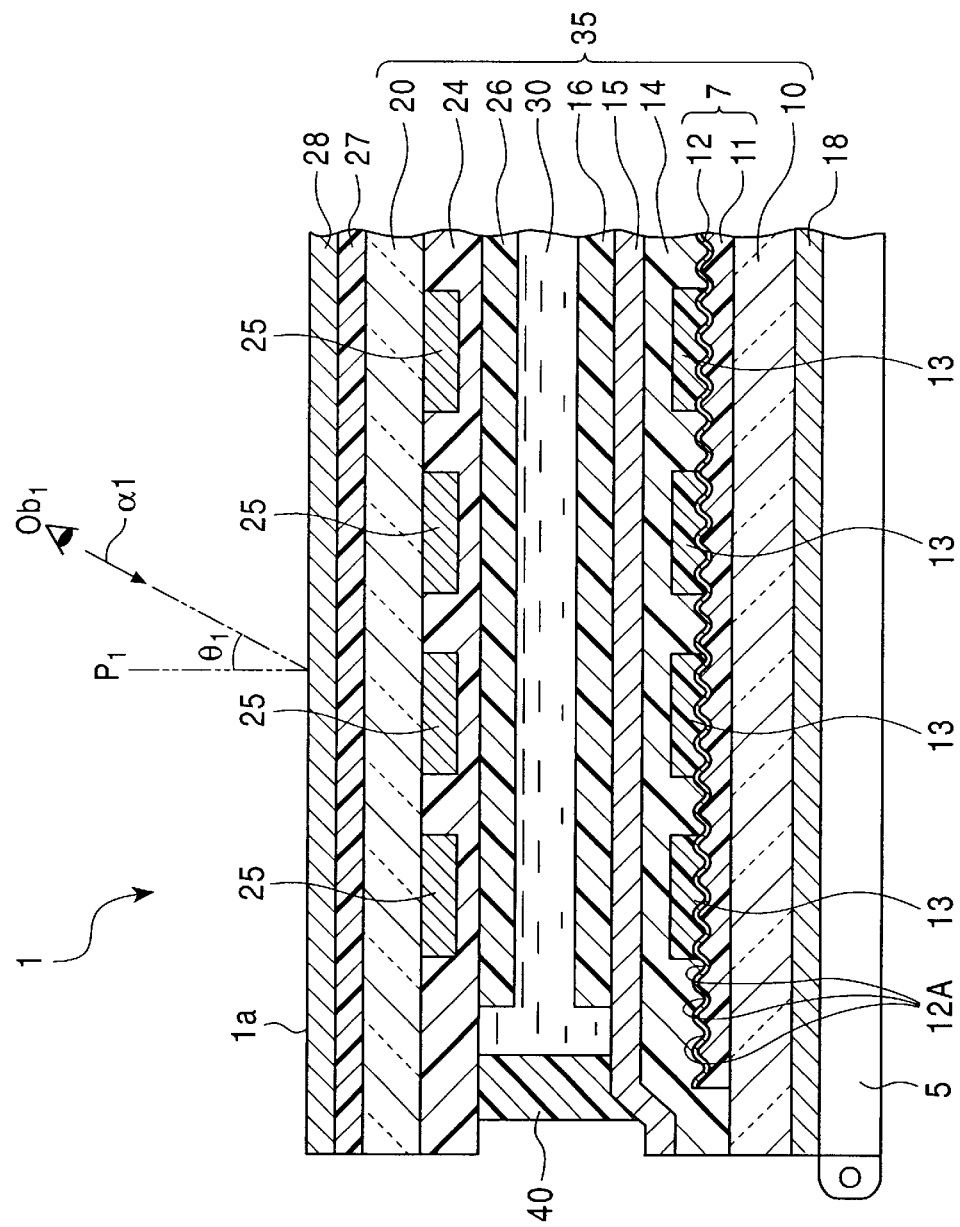
FIG. 1 is a partial sectional view of the structure of a transflective liquid crystal display device of a first embodiment of the present invention.

FIG. 1 is a partial sectional view schematically illustrating the structure of a transflective liquid crystal display device of a first embodiment of the present invention including an end portion thereof.

In FIG. 1, a transflective liquid crystal display device 1 of the present invention is constructed by integrally forming a first substrate 10 and a second substrate 20 by bonding them with sealing materials 40 that are applied in annular shapes to peripheral end portions of the two substrates 10 and 20. The first substrate 10 and the second substrate 20 are formed of, for example, pieces of transparent glass that oppose each other so as to sandwich a liquid crystal layer 30.

A reflector 7, a color filter 13 for performing a color display, an overcoat film 14 for covering and protecting the reflector 7 and for leveling bumpy portions of the color filter 13, a transparent electrode layer 15 for driving the liquid crystal layer 30, and an alignment film 16 for controlling the orientation of liquid crystal molecules making up the liquid crystal layer 30 are placed upon each other in that order at the liquid-crystal-layer-30 side of the first substrate 10. A transparent electrode layer 25, an overcoat film 24, and an alignment film 26 are placed upon each other in that order at the liquid-crystal-layer-30 side of the second substrate 20.

The first substrate 10 and the second substrate 20 and the component parts disposed between these substrates 10 and 20 form a liquid crystal cell 35.

A polarizing plate 18 is provided at a side of the first substrate 10 opposite to the liquid-crystal-layer-30 side (that is, at the outside surface side of the first substrate 10). A retardation plate 27 and a polarizing plate 28 are placed upon each other in that order at a side of the second substrate 20 opposite to the liquid-crystal-layer-30 side (that is, at the outside surface side of the second substrate 20). The outside surface of the polarizing plate 28 is a display surface 1a.

A backlight 5 serving as a light source for performing a transmission display operation in the transflective liquid crystal display device 1 is disposed at the outer side of the polarizing plate 18 formed on the first substrate 10.

In the transflective liquid crystal display device 1, when an angle $\theta_1$ between a main viewing direction $\alpha_1$ and a normal line direction $P_1$ with respect to the display surface 1a of the liquid crystal display device 1 is from about 0 degrees to about 20 degrees, a peak value of a reflection ratio of light incident upon the liquid crystal cell 35 and reflected by the reflector 7 is set so as to occur within a range of about 30 degrees from the normal line direction $P_1$, and, preferably, within a range of about 20 degrees from the normal line direction $P_1$.

The reflector 7 comprises an organic film (base material) 11 and a metallic reflective film (metallic film) 12 formed on the organic film 11. The organic film 11 provides a bumpy form to the metallic reflective film 12 formed on the organic film 11 in order to efficiently scatter reflected light. By providing a bumpy form to the metallic reflective film 12 in this way, the light incident upon the liquid crystal display device can be efficiently reflected, so that a bright display can be realized in a reflection mode.

Figure 2:
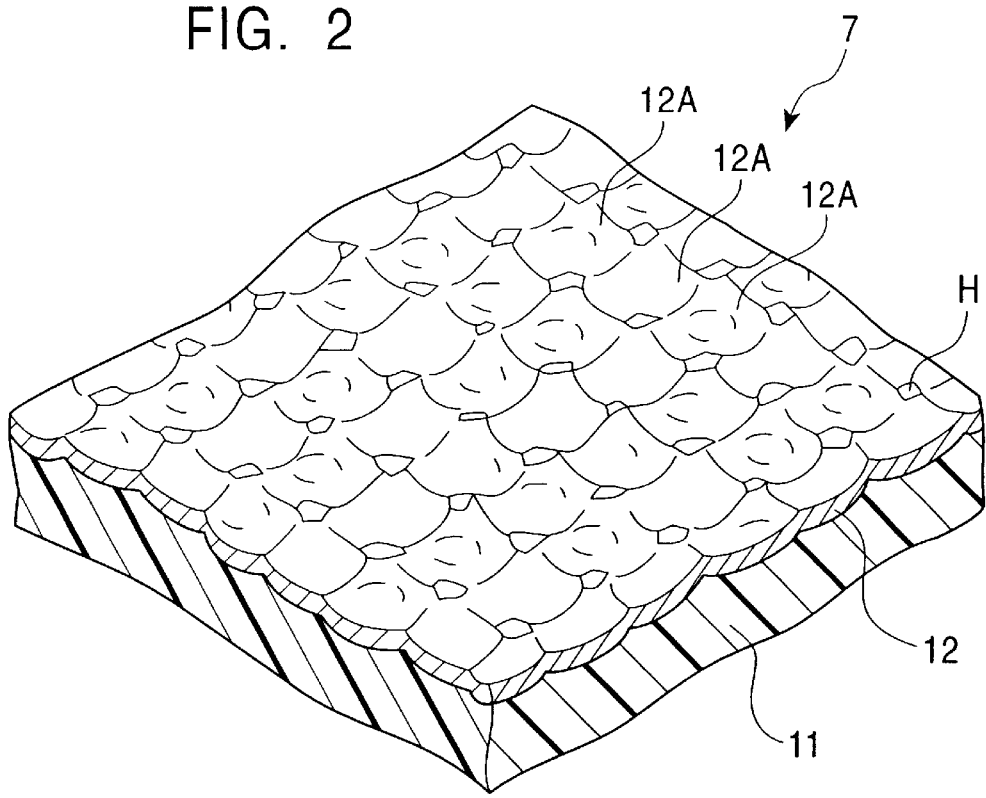
FIG. 2 is a perspective view showing in enlarged form a reflector, formed of an organic film and a metallic reflective film, of the liquid crystal display device of FIG. 1.

FIG. 2 is a perspective view of the reflector 7 comprising the organic film 11 and the metallic reflective film 12 formed thereon. As shown in FIG. 2, a plurality of recesses 12A whose inside surfaces form parts of spherical surfaces are continuously formed in the surface of the organic film 11 so as to overlap each other in the horizontal direction. The metallic reflective film 12 is placed upon this recessed surface of the organic film 11.

The recesses 12A are randomly formed with depths in a range of from about 0.1 μm to about 3 μm. The recesses 12A are randomly disposed so that pitches between adjacent recesses 12A lie in a range of from about 5 μm to about 50 μm. The inclination angles of the inside surfaces of the recesses 12A are set within a range of from –about 30 degrees to +about 30 degrees.

That the inclination angle distribution of the inside surfaces of the recesses 12A is set within the range of from –about 30 degrees to +about 30 degrees, and that the pitches between adjacent recesses 12A are set randomly with respect to all directions in a plane are particularly important points. This is because, if the pitches between adjacent recesses 12A are regular, the reflected light becomes colored due to interference problems. When the inclination angle distribution of the inside surfaces of the recesses 12A falls outside the range of from –about 30 degrees to +about 30 degrees, the scattering angle of reflected light becomes too wide, so that the intensity of the reflected light is reduced, as a result of which a bright display cannot be obtained (in air, the scattering angle of reflected light becomes equal to or greater than 36 degrees, so that a reflection intensity peak inside the liquid crystal display device is decreased, thereby increasing total reflection loss).

In order to change a reflection property set in the liquid crystal display device 1 about 30 degreesabout 20 degrees, for example, the inclination angle distribution of the inside surfaces of the recesses 12A of the reflector 7 of the liquid crystal display device 1 may be changed. However, in this case the inclination angle distribution of the inside surfaces of the recesses 12A lies within the aforementioned range. In one example, a reflection property which allows the peak value of the reflection ratio of reflected light to occur within about 30 degrees from the normal line direction $P_1$ may be decreased to within about 20 degrees from the normal line direction $P_1$.

When the depths of the recesses 12A become greater than 3 μm, the top portions of protruding portions cannot be covered by the planarizing film (overcoat film 14) when the recesses 12A are made level in a post-processing operation, so that a desired surface flatness cannot be obtained, thereby causing the display to be uneven.

When the pitch between adjacent recesses 12A is less than about 5 μm, there are restrictions in the transfer-type production method used to form the organic film 11, so that the processing time becomes very long, giving rise to problems such as not being able to fabricate a shape required to provide the desired reflection property and production of interference light. When, from a practical standpoint, a diamond indentor with a diameter of from 30 μm to 100 μm capable of being used in the aforementioned transfer-type production method is used, it is desirable to set the pitch between adjacent recesses 12A in the range of from about 5 μm to about 50 μm.

The organic film (base material) 11 is obtained in the following way. A photosensitive resin liquid, such as acrylic resist, is applied to the first substrate 10 by, for example, spin coating. A photosensitive resin layer is formed by prebaking the applied photosensitive resin liquid. Then, a transfer-type device having a bumpy surface and flat surfaces along the peripheral edges of the bumpy portion is pushed against the surface of the photosensitive resin layer in order to transfer the shape of the bumpy surface of the transfer-type device onto the surface of the photosensitive resin layer.

For the metallic reflective film 12, it is preferable to use a metallic material having a high reflection ratio, such as aluminum (Al) or silver (Ag). Any of these materials can be deposited by a deposition method, such as sputtering or vacuum deposition.

It is desirable that the metallic reflective film 12 have a thickness within a range of from about 8 nm to about 50 nm (80 Å to 500 Å) due to the following reasons. When the film thickness is less than about 8 nm, the display in the reflection mode becomes dark because the light reflection ratio of the metallic reflective film 12 is too small. On the other hand, when the film thickness is greater than about 50 nm, the display in a transmission mode becomes dark because of a reduction in the transmittancy of the metallic reflective film 12.

It is more desirable that the metallic reflective film 12 have a thickness within a range of from about 8 nm to about 30 nm (80 Å to 300 Å). When the thickness of the metallic reflective film 12 falls within this range, the display during the transmission mode can be made bright, so that the difference in brightness of the display between that in the transmission mode and that in the reflection mode can be reduced. Therefore, it is possible to make the display easier to view when the transflective liquid crystal display device 1 by switching between the two operation modes. It is most desirable for the metallic reflective film 12 to have a thickness within a range of from about 8 nm to about 20 nm (80 Å to 200 Å). When the film thickness is set within this range, it is possible to maintain the brightness of the display in the reflection mode and to realize a display of high brightness in the transmission mode.

The electrode layer 15 is formed by disposing and forming a plurality of transparent electrically conductive films, such as ITO (indium tin oxide) films, that are planar and have the shapes of strips. In order to drive the liquid crystal molecules making up the liquid crystal layer 30 by individually connecting the plurality of the transparent electrically conductive films to an external drive circuit (not shown), the electrode layer 15 is formed on the overcoat film 14. Similarly, the electrode layer 25 is formed by disposing and forming a plurality of transparent electrically conductive films, such as ITO (indium tin oxide) films, that are planar and have the shapes of strips. The transparent electrically conductive films 25 are individually connected to the external drive circuit. The electrode layers 15 and 25 are disposed at right angles in plan view, so that the liquid crystal display device 1 is a passive matrix type.

In the transflective liquid crystal display device 1 of the embodiment, by providing the reflector 7 with a plurality of recesses 12A having the above-described structure, the peak value of the reflection ratio of light incident upon the liquid crystal cell 35 and reflected by the reflector 7 is set so as to occur in the range of about 30 degrees from the normal line direction $P_1$. In the reflection mode, the amount of reflected light within the range of about 30 degrees from the normal line direction $P_1$ with respect to the display surface 1a of the liquid crystal display device 1 becomes large, so that the distribution of the amount of reflected light in a direction close to a viewing point $Ob_1$ of the viewer becomes large. Accordingly, at a practical viewing point, particularly when the angle $\theta_1$ between the main viewing direction $\alpha_1$ and the normal line direction $P_1$ lies in the range of from about 0 to about 20 degrees, the liquid crystal display device can provide a bright display (screen).

In particular, in the liquid crystal display device in which the peak value of the reflection ratio of light incident upon the liquid crystal cell 35 and reflected by the reflector 7 is set so as to occur in the range of about 20 degrees from the normal line direction $P_1$, the amount of light reflected within the range of about 20 degrees from the normal line direction $P_1$ with respect to the display surface 1a of the liquid crystal display device 1 in the reflection mode becomes large, so that the distribution of the amount of reflected light in a direction close to the viewing point $Ob_1$ of the viewer becomes large, and an area where the amount of reflected light is large is widened. Accordingly, at a practical viewing point, particularly when the angle $\theta_1$ between the main viewing direction $\alpha_1$ and the normal line direction $P_1$ lies in the range of from about 0 to about 20 degrees, the liquid crystal display device can provide a bright display (screen).

Even though the metallic reflective film 12 that is thin is used, the transflective liquid crystal display device 1 of the embodiment can provide a sufficiently bright display in the reflection mode. Since the metallic reflective film 12 is thin, the transflective liquid crystal display device 1 can provide a display of high brightness in the transmission mode. This is because the surface of the organic film 11 has the aforementioned form. More specifically, when the transmittance is increased by making the metallic reflective film 12 thin, the reflection ratio of the metallic reflective film 12 is reduced. However, by continuously forming the plurality of recesses 12A whose inside surfaces form parts of spherical surfaces in the surface of the organic film 11, the efficiency with which light is reflected by the metallic reflective film 12 can be maximally increased, so that a bright display can be achieved in the transmission mode without greatly reducing the brightness of the display in reflection mode.

When the metallic reflective film 12 has a thickness of from about 8 nm to about 20 nm, the liquid crystal display device 1 of the embodiment can achieve a very bright display in the transmission mode. This is achieved not only by increasing the transmittance by making the metallic reflective film 12 very thin, but also by the added effect arising from the shape of the surface of the organic film 11. More specifically, when the inside surfaces of the recesses 12A formed in the surface of the organic film 11 are formed into spherical shapes as shown in FIG. 2, the recesses 12A has the effect of acting as lenses with respect to light incident upon the organic film 11 from the substrate 10 side. Since light from the backlight 5 passing through the organic film 11 is intensified, it is possible to obtain a very bright display.

Although, in the embodiment, the liquid crystal display device of the present invention is described as being used as a passive matrix transflective liquid crystal display device, the present invention is not limited thereto. The present invention can be applied to an active matrix type liquid crystal display device. In this case, for example, the aforementioned reflector having a plurality of recesses with light reflectivity formed in the surface thereof is provided above or below a pixel electrode forming pixels.

Figure 3:
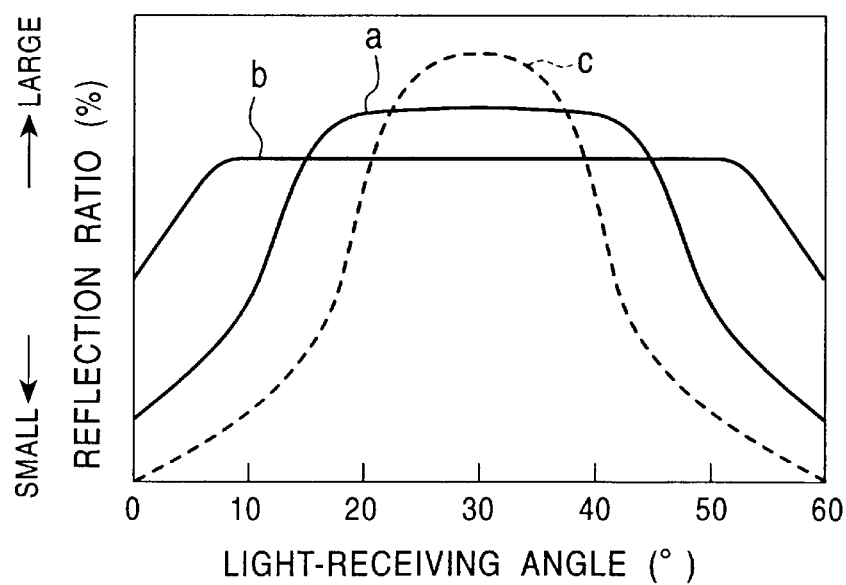
FIG. 3 is a graph showing the relationship between light-receiving angle and reflection ratio of the liquid crystal display device of the embodiment and that of a comparative-example liquid crystal display device.

FIG. 3 illustrates the relationship between light-receiving angle (°) and brightness (reflection ratio) when the display surface 1a of the liquid crystal display device 1 of the first embodiment without a backlight is irradiated with outside light at an incidence angle of about 30 degrees (that is, an angle made by the optical axis of the outside light that illuminates the display surface 1a from a side opposite to the viewing point $Ob_1$ of the viewer looking at the display from one side of a line perpendicular to the display surface 1a (the normal line)), and when the viewing direction $\alpha$ (light receiving angle) is swung up to 60 degrees from the perpendicular line position (normal line position) of 0 degrees. In FIG. 3, solid lines a and b show the relationships between the light receiving angle and the reflection ratio of the liquid crystal display device of the first embodiment. The solid lines a and b are obtained when the depths and the like of the recesses 12A of the reflector 7 are varied.

Figure 12:
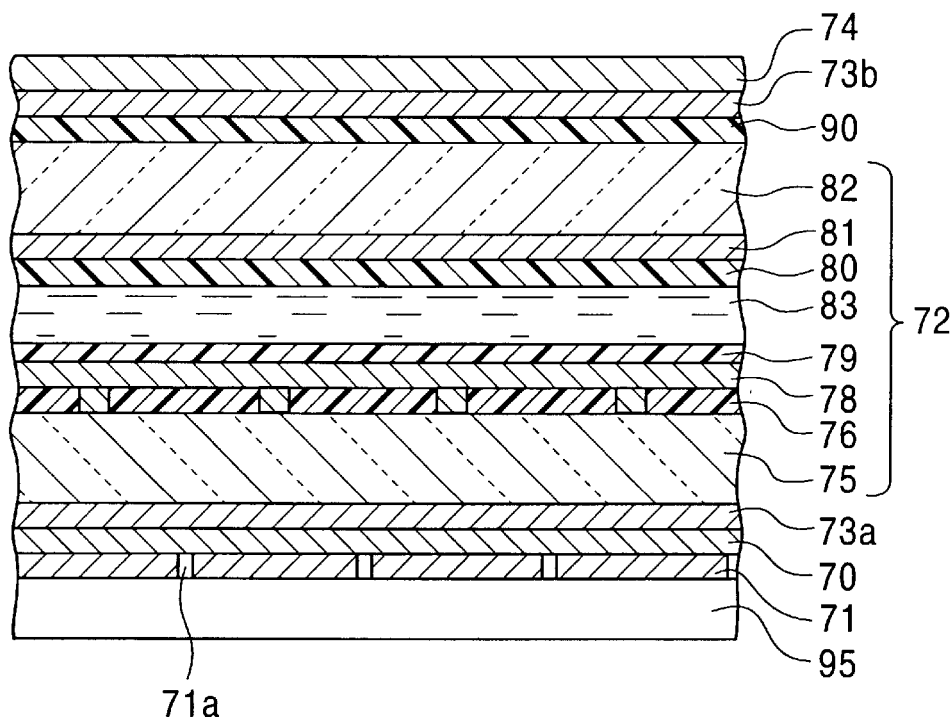
FIG. 12 is a sectional view schematically showing the structure of an example of a related transflective liquid crystal display device.
Figure 13:
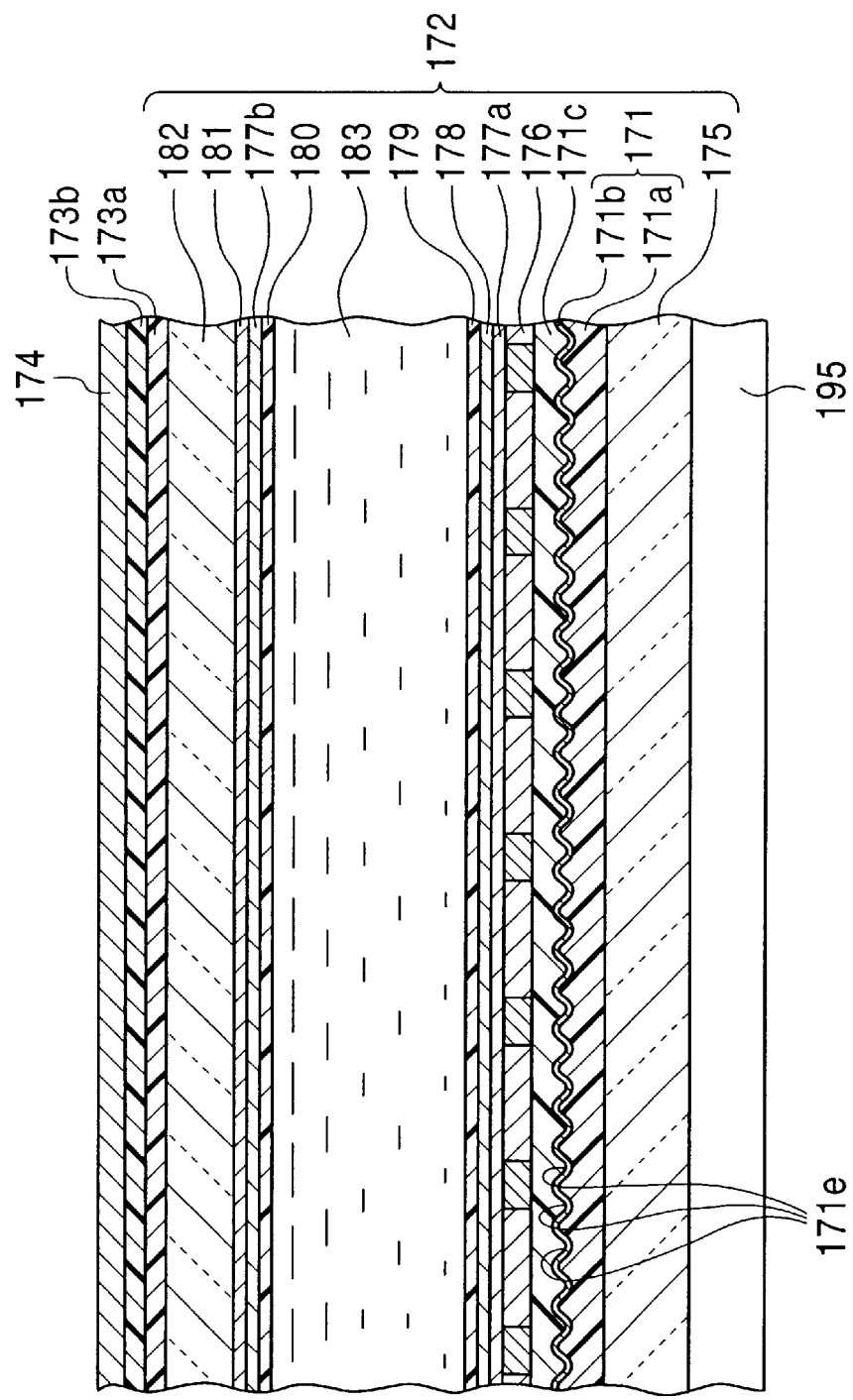
FIG. 13 is a sectional view of another example of a related transflective liquid crystal display device.
Figure 14:
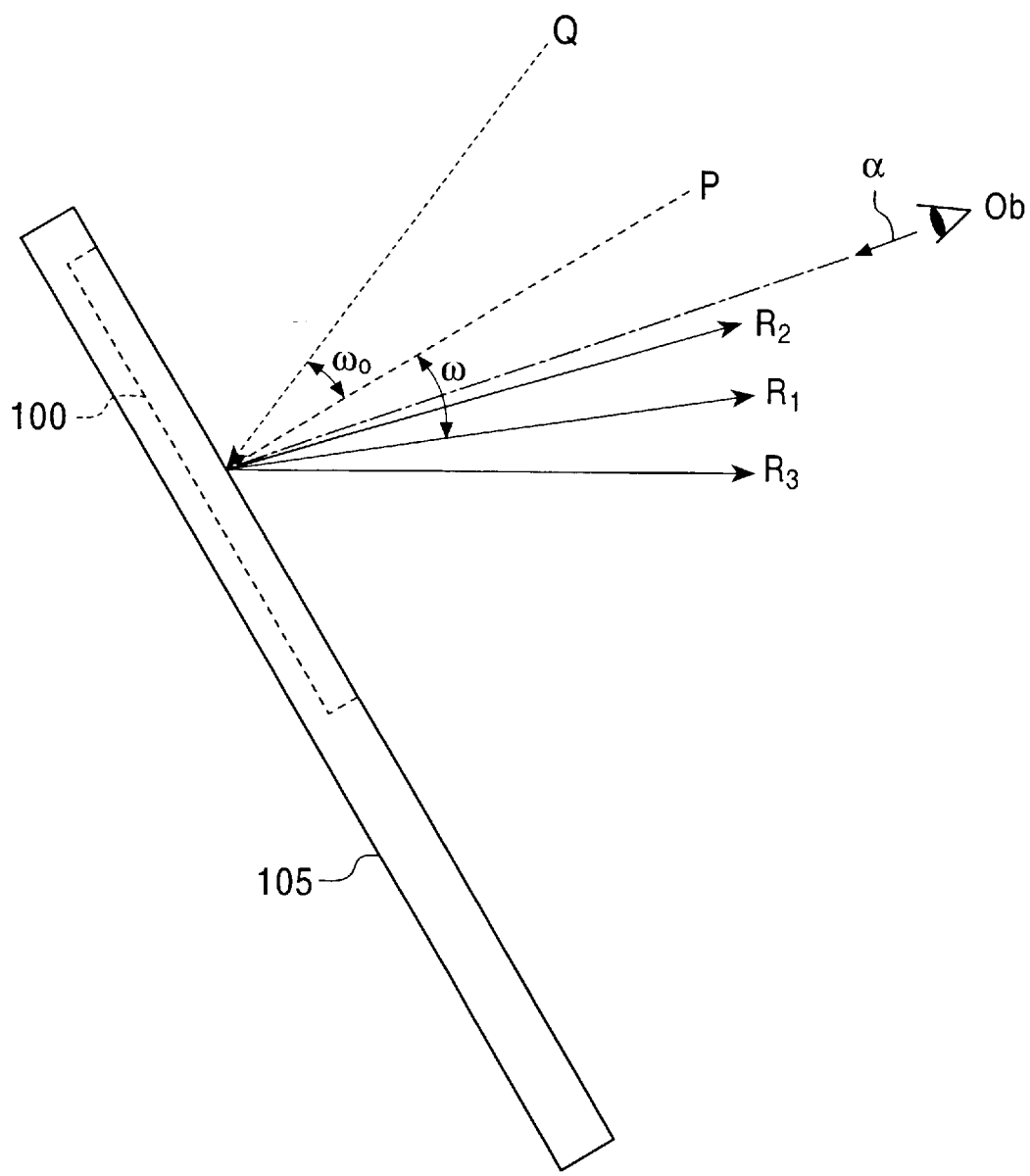
FIG. 14 illustrates a state in which a transflective liquid crystal display device provided in a cellular phone is being used.

In FIG. 3, as a comparative example, the relationship between light-receiving angle and reflection ratio of the related liquid crystal display device shown in FIG. 12 or 13 that does not use a backlight is indicated by a broken line c.

As is clear from FIG. 3, in the liquid crystal display device of the comparative example, the peak reflection ratio value occurs at the specular reflection angle (light-receiving angle of about 30 degrees). When the light-receiving angle becomes less than about 20 degrees, the reflection ratio is greatly reduced. Therefore, although the display appears bright when viewed from the specular reflection direction, the display appears dark when viewed from other directions.

In contrast, in the liquid crystal display device of the first embodiment having the property represented by the solid line a, a particularly high reflection ratio peak value area centered on the light-receiving angle of about 30 degrees exists. In addition, the reflection ratio peak value exits within the range of about 20 degrees from the normal line direction (light-receiving angle of 0 degrees). Therefore, compared to the comparative example, the reflection ratio is higher in the light-receiving angles of from about 0 to about 20 degrees. Consequently, when the viewer looks at the display from a direction close to the normal line direction, the display appears brighter than in the comparative example.

In the embodiment of solid line a, the reflection ratio is substantially constant over a range of about 20 degrees (from about 20 degrees to about 40 degrees). The range of substantially constant reflection ratio of the embodiment of solid line a is larger that that of comparative example c, while the maximum reflection ratio (at the center of the reflection ratio curve) may be decreased from that of comparative example c. This is to say that the display of the embodiment of solid line a may be less intensely bright than comparative example c at a less useful angle to the typical user (peak of c), but is brighter than comparative example c over a broader and more useful range of typically used viewing angles (i.e. closer to normal from the display).

In the liquid crystal display device of the first embodiment having the property represented by the solid line b, a particularly high reflection ratio peak value area centered on the light-receiving angle of about 30 degrees exists. In addition, the reflection ratio peak value exits within the range of about 10 degrees from the normal line direction (light-receiving angle of 0 degrees). Therefore, compared to the comparative example, the reflection ratio is higher in the light-receiving angles of from 0 to about 10 degrees. Consequently, when the viewer looks at the display from a direction close to the normal line direction, the display appears brighter than in the comparative example.

Similar to the above embodiment of solid line a, in the embodiment of solid line b the reflection ratio is substantially constant over a range of about 40 degrees (from about 10 degrees to about 50 degrees). The range of substantially constant reflection ratio of the embodiment of solid line b is larger that that of comparative example c, while the maximum reflection ratio may be decreased from that of comparative example c. This is to say that the display of the embodiment of solid line b may be less intensely bright than comparative example c at a less useful angle to the typical user (peak of c), but is brighter than comparative example c over a broader and more useful range of typically used viewing angles.

For this reason, when the liquid crystal display device of the embodiment having any of the above-described structures is incorporated in a display section of a portable electronic apparatus, such as a cellular phone or a notebook-size personal computer, the visibility is, in particular, good.

[Second Embodiment]

The liquid crystal display device of the first embodiment is described as being an internal attachment type in which the reflector 7 for reflecting outside light incident thereupon is incorporated between the substrates 10 and 20. A liquid crystal display device of a second embodiment is an external attachment type in which a reflector is provided outwardly of two substrates that sandwich a liquid crystal layer. The liquid crystal display device of the second embodiment will be described below with reference to FIG. 4. Component parts similar to those used in the first embodiment are given the same reference numerals and descriptions thereof will be simplified.

Figure 4:
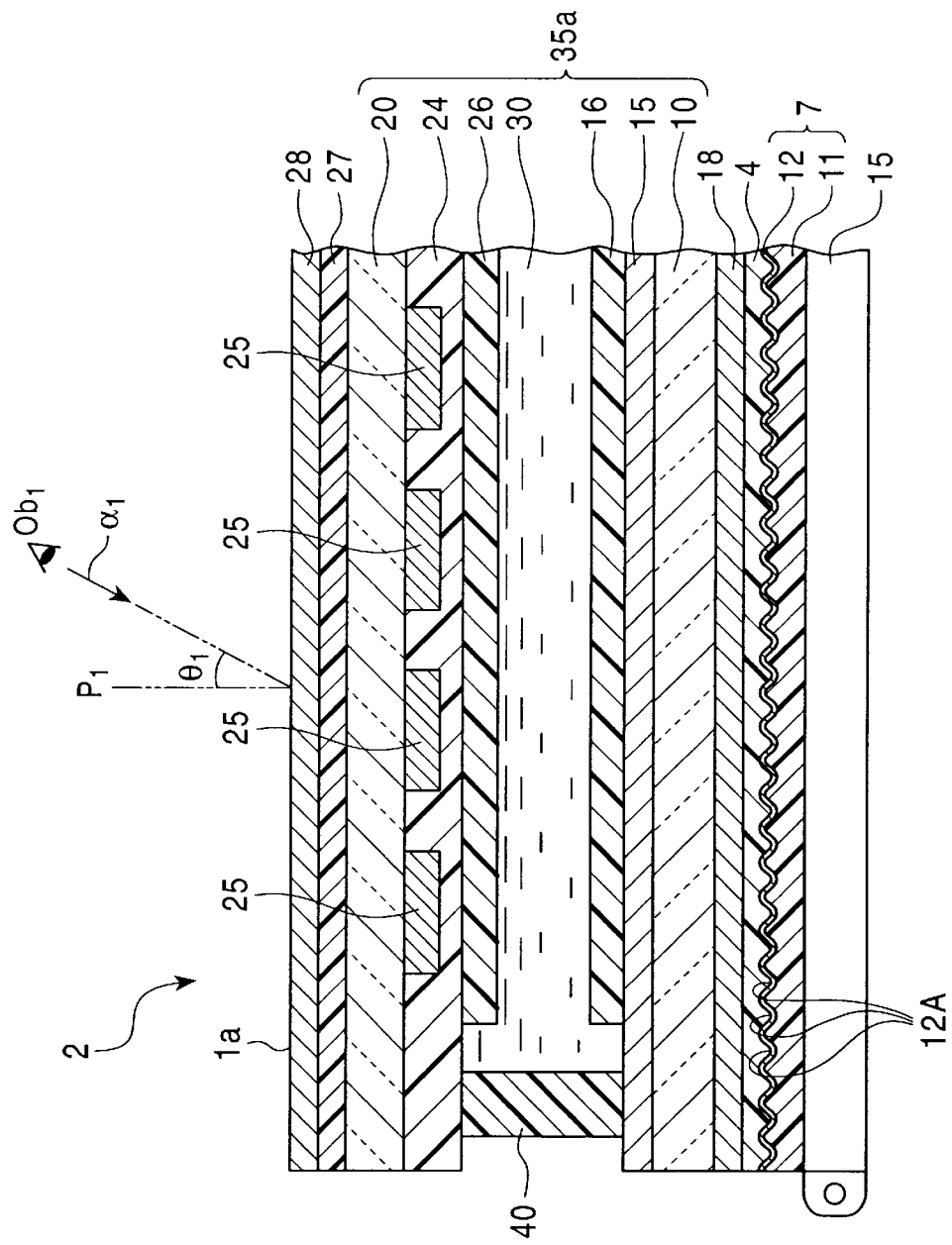
FIG. 4 is a partial sectional view of the structure of a transflective liquid crystal display device of a second embodiment of the present invention.

FIG. 4 is a partial sectional view showing the structure of a transflective liquid crystal display device 2 of the second embodiment of the present invention.

The transflective liquid crystal display device 2 of the second embodiment differs from the transflective liquid crystal display device 1 of the first embodiment in that an overcoat film 14, a color filter 13, and a reflector 7 are not provided between a first substrate 10 and an electrode 15 and in that a reflector 7 similar to that described in the first embodiment is provided between the first substrate 10 and a backlight 5.

The first substrate 10 and a second substrate 20 and component parts that are provided between the first and second substrates 10 and 20 form a liquid crystal cell 35a.

In the transflective liquid crystal display device 2 of the second embodiment, when, as in the first embodiment, an angle $\theta_1$ between a main viewing direction $\alpha_1$ and a normal line direction $P_1$ with respect to a display surface 1a of the liquid crystal display device 2 is from about 0 degrees to about 20 degrees, a peak value of a reflection ratio of light incident upon the reflector 7 by entering the liquid crystal cell 35a and reflected by the reflector 7 is set so as to occur within a range of about 30 degrees from the normal line direction $P_1$, and, preferably, within a range of about 20 degrees from the normal line direction $P_1$.

A color filter film (not shown) may be formed between the first substrate 10 and the electrode 15 by, for example, printing in order to make it possible for the liquid crystal display device 2 to provide a color display.

In the transflective liquid crystal display device 2 of the embodiment, by providing the reflector 7 with a plurality of recesses 12A having the above-described structure, the peak value of the reflection ratio of light incident upon the reflector 7 by entering the liquid crystal cell 35a and reflected by the reflector 7 is set so as to occur in the range of about 30 degrees from the normal line direction $P_1$. In a reflection mode, the amount of reflected light within the range of about 30 degrees from the normal line direction $P_1$ with respect to the display surface 1a of the liquid crystal display device 2 becomes large, so that the distribution of the amount of reflected light in a direction close to a viewing point $Ob_1$ of a viewer becomes large. Accordingly, from a practical viewing point, particularly when the angle $\theta_1$ between the main viewing direction $\alpha_1$ and the normal line direction $P_1$ lies in a range of from about 0 to about 20 degrees, the liquid crystal display device can provide a bright display (screen).

In particular, in the liquid crystal display device in which the peak value of the reflection ratio of light incident upon the reflector 7 by passing through the liquid crystal cell 35a and reflected by the reflector 7 is set so as to occur in the range of about 20 degrees from the normal line direction $P_1$, the amount of light reflected within the range of about 20 degrees from the normal line direction $P_1$ with respect to the display surface 1a of the liquid crystal display device 2 in the reflection mode becomes large, so that the distribution of the amount of reflected light in a direction close to the viewing point $Ob_1$ of the viewer becomes large. In addition, an area where the amount of reflected light is large is widened. Accordingly, at a practical viewing point, particularly when the angle $\theta_1$ between the main viewing direction $\alpha_1$ and the normal line direction $P_1$ lies in the range of from about 0 to about 20 degrees, the liquid crystal display device can provide a bright display (screen).

The reflector 7 used in the second embodiment can be disposed outwardly of the substrates 10 and 20 that form the liquid crystal cell 35a, so that, if the liquid crystal display device is a transmissive liquid crystal display device, the reflector 7 can be mounted without creating any problems. Therefore, it is possible to form a transflective liquid crystal display device which can provide a bright display in either the reflection mode or the transmission mode.

The transflective liquid crystal display device of the second embodiment is described as being a passive matrix type transflective liquid crystal display device. However, the present invention may be applied to a three-terminal (TFT: thin-film transistor) active matrix or two terminal active matrix type liquid crystal display devices without creating any problems.

The transflective liquid crystal display devices of the first and second embodiments are described as including the polarizing plates 18 provided at the outer sides of their corresponding first substrates 10. However, they do not need to include the polarizing plates 18 provided at the outer sides of their corresponding first substrates 10. In that case, the optical condition of each component part making up the liquid crystal display devices of the first and second embodiment is adjusted so that good display characteristics are obtained.

The liquid crystal display devices of the first and second embodiments of the present invention are described as being used as transflective liquid crystal display devices. However, they may be used as reflective liquid crystal display devices, in which case the corresponding backlights 5 do not need to be provided, and the metallic reflective films 12 may be thinner than about 50 nm.

(Third Embodiment)

Figure 5:
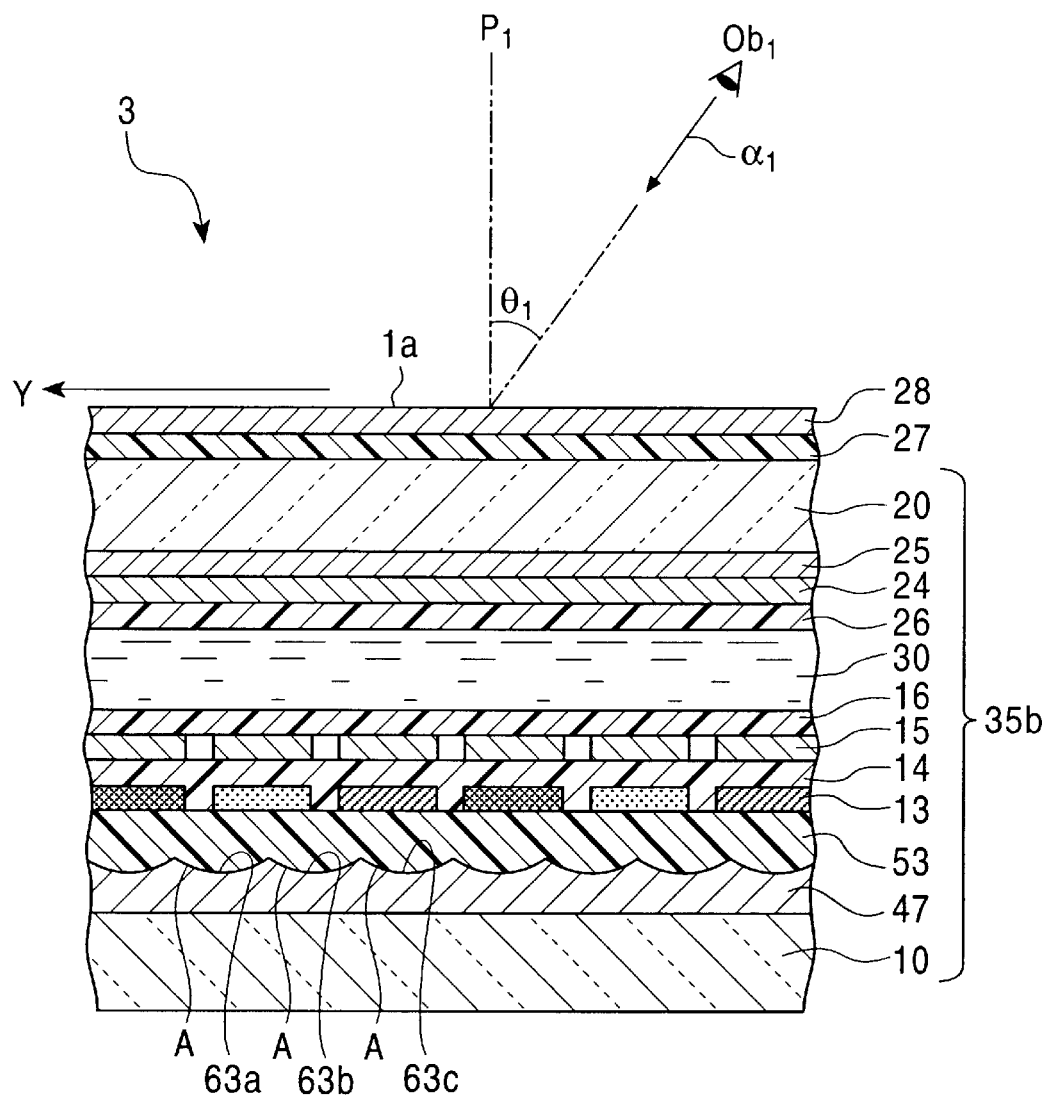
FIG. 5 is a partial sectional view of the structure of a reflective liquid crystal display device of a third embodiment of the present invention.

FIG. 5 is a partial sectional view schematically showing the structure of a reflective liquid crystal display device of a third embodiment of the present invention.

In FIG. 5, a reflective liquid crystal display device 3 is constructed by integrally forming a first substrate 10 and a second substrate 20 by bonding them with sealing materials that are applied in annular shapes to peripheral end portions of the two substrates 10 and 20. The first substrate 10 and the second substrate 20 are formed of, for example, pieces of transparent glass that oppose each other so as to sandwich a liquid crystal layer 30.

A reflector 47, a transparent interstitial layer 53, a color filter 13 for performing a color display, an overcoat film (transparent planarizing layer) 14 for leveling bumpy portions of the color filter 13, a transparent electrode layer 15 for driving the liquid crystal layer 30, and an alignment film 16 for controlling the orientation of liquid crystal molecules making up the liquid crystal layer 30 are placed upon each other in that order at the liquid-crystal-layer-30 side of the first substrate 10. A transparent electrode layer 25, an overcoat layer 24, and an alignment film 26 are placed upon each other in that order at the liquid-crystal-layer-30 side of the second substrate 20.

The first substrate 10 and the second substrate 20 and the component parts disposed between these substrates 10 and 20 form a liquid crystal cell 35b.

A polarizing plate 18 is provided at a side of the first substrate 10 opposite to the liquid-crystal-layer-30 side (that is, at the outside surface side of the first substrate 10). A retardation plate 27 and a polarizing plate 28 are placed upon each other in that order at a side of the second substrate 20 opposite to the liquid-crystal-layer-30 side (that is, at the outside surface side of the second substrate 20). The outside surface of the polarizing plate 28 is a display surface 1a.

In the transflective liquid crystal display device 3, when an angle $\theta_1$ between a main viewing direction $\alpha_1$ and a normal line direction $P_1$ with respect to the display surface 1a of the liquid crystal display device 3 is from about 0 degrees to about 20 degrees, a peak value of a reflection ratio of light incident upon the liquid crystal cell 35b and reflected by the reflector 47 is set so as to occur within a range of angles less than about 30 degrees from the normal line direction $P_1$, and, more desirably, within a range of about 20 degrees from the normal line direction $P_1$.

Figure 6:
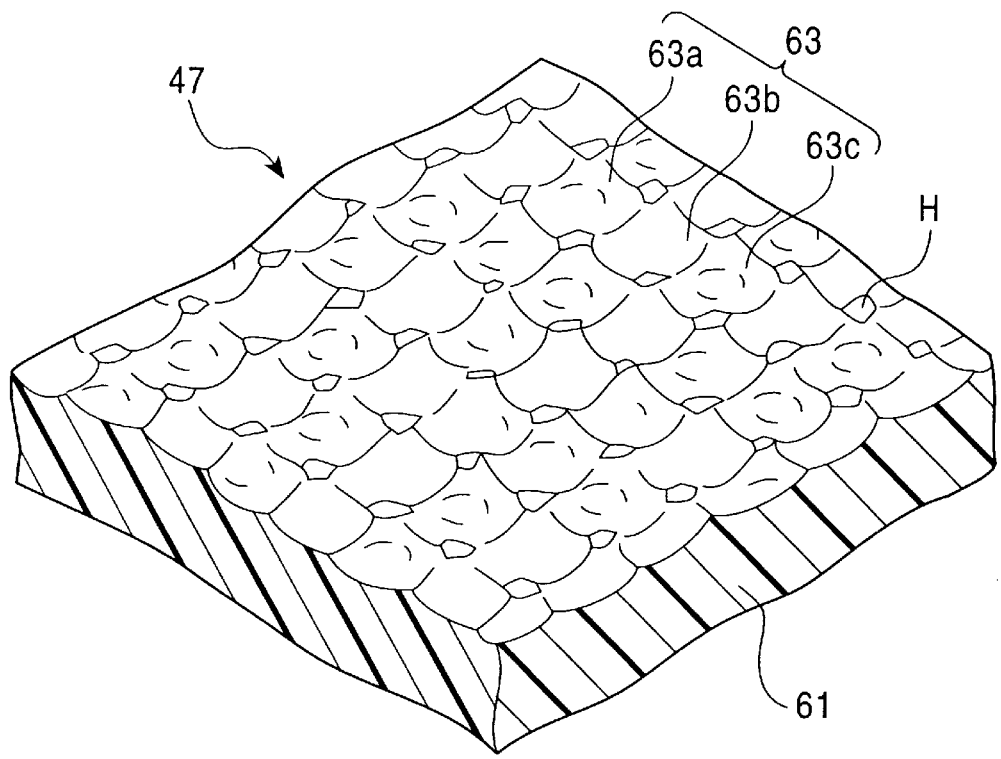
FIG. 6 is a perspective view showing in enlarged form a reflector of the liquid crystal display device shown in FIG. 5.

The reflector 47 of the reflective liquid crystal display device 3 has a plurality of recesses 63a, 63b, 63c, etc. (generally referred to as recesses 63) with light reflectivity formed adjacent each other in an irregular manner in a surface (reference surface H) of a planar base material 61, such as aluminum, as shown in FIG. 6.

Figure 7:
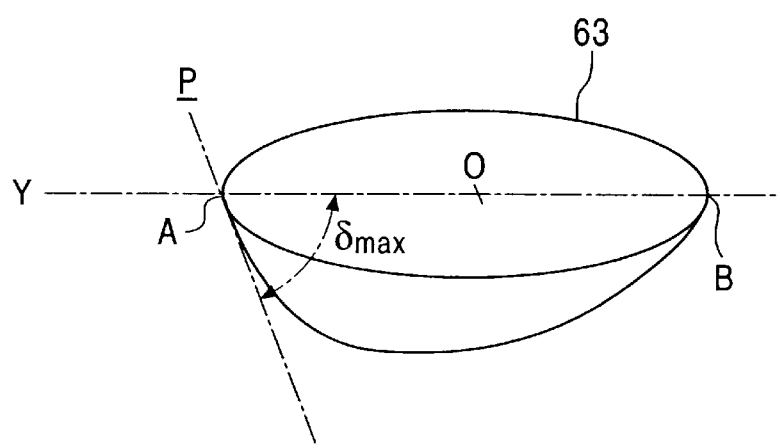
FIG. 7 is a perspective view of one recess formed in the surface of the reflector shown in FIG. 6.
Figure 8:
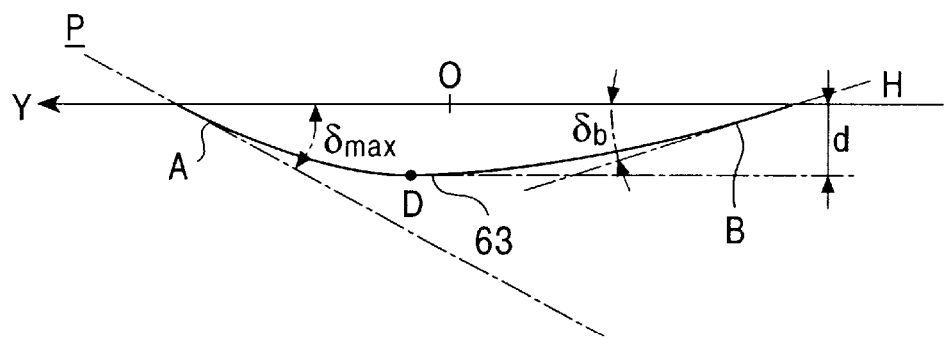
FIG. 8 is a sectional view showing the recess shown in FIG. 7.

As shown in FIG. 7 (perspective view) and FIG. 8 (sectional view), these recesses 63 have recessed surfaces that are circular in plan view. Each recessed surface is a spoon-shaped aspherical surface whose vertex represented by D in FIG. 8 is displaced in one direction (Y direction) from a center O of a corresponding circular shape in plan view, and is formed so that an inclination angle $\delta$ (absolute value of an angle between the base material surface H and a tangential plane P at any point on the curvature) at one side portion A is a maximum, that is, becomes a maximum inclination angle $\delta_{max}$. An inclination angle $\delta_b$ at a side portion B opposite to the side portion A with the center O disposed between the side portions A and B is smaller than the inclination angle (maximum inclination angle $\delta_{max}$) at the side portion A. In the reflector 47 used in the embodiment, the maximum inclination angles $\delta_{max}$ of the recesses 63a, 63b, 63c, etc., differ irregularly so as to have values within a range of from about 2 degrees to about 90 degrees. However, the maximum inclination angles $\delta_{max}$ of most of the recesses 63 differ irregularly and have values within a range of from about 4 degrees to about 35 degrees.

The recessed surface of each recess 63 has a single minimum point D (that is, a point on the curved surface where its inclination angle is zero). The distance between the minimum point D and the reference surface H of the base material of each recess 63 forms a depth d of each recess 63. The depths d of the recesses 63a, 63b, 63c, etc., differ irregularly so as to have values within a range of from about 0.1 $\mu$m to about 3 $\mu$m.

Figure 9:
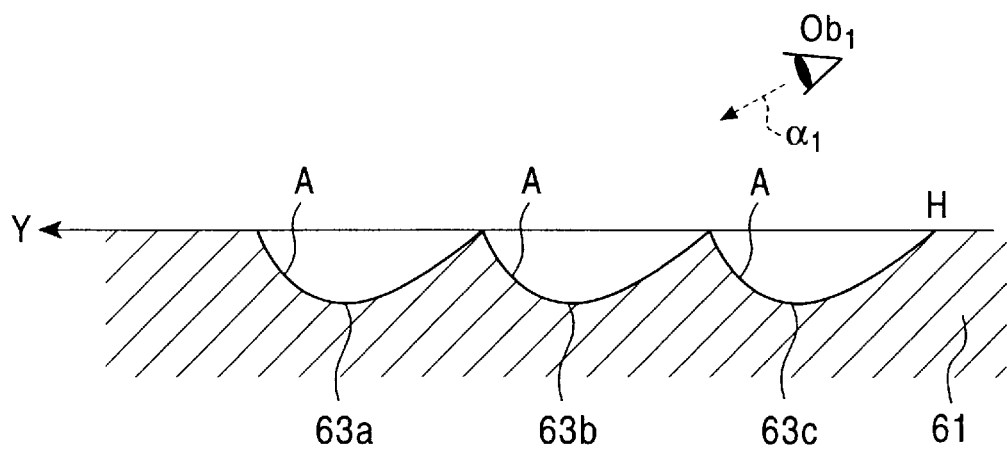
FIG. 9 is a sectional view of the reflector shown in FIG. 6.

In the embodiment, as shown in FIG. 9, the recesses 63a, 63b, 63c, etc., are formed so that their side portions A including the maximum inclination angles $\delta_{max}$ of the corresponding recessed surfaces are aligned in direction Y far away from a viewing point $Ob_1$ of the viewer.

Figure 10:
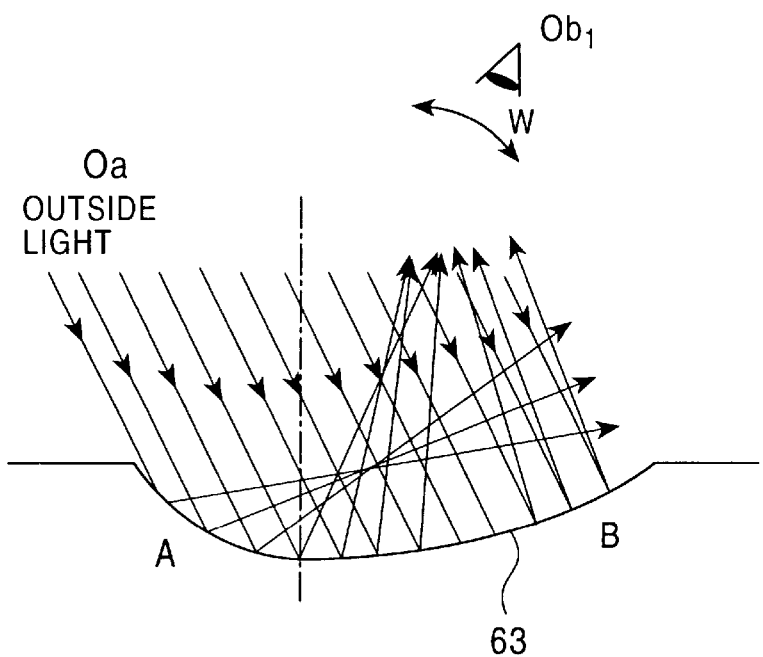
FIG. 10 is a sectional view showing one recess formed in the reflector shown in FIG. 6.

In general, outside light is incident upon the recesses 63 from various directions and is reflected in various directions in accordance with the inclination angles at the incidence points on the curved surfaces of the corresponding recesses 63. Therefore, reflected light is as a whole scattered within a wide viewing angle range. However, as shown in FIG. 10, when outside light incident from, for example, an Oa direction is viewed and the direction of reflection is followed, a large portion of the reflected light tends to be slanted and gathered in a direction opposite to a side portion A including the corresponding maximum angle $\delta_{max}$, that is, within range W (a clear viewing range), shown in FIG. 10, at the viewer side.

Therefore, when the viewing point $Ob_1$ of the viewer is placed within the clear viewing range W, the display appears brighter than when the display is viewed from other directions. In other words, the viewing point $Ob_1$ of the viewer is usually concentrated in a direction close to the normal line direction $P_1$ of the display surface 1a. More specifically, the viewing point $Ob_1$ is concentrated in a direction within the range of about 20 degrees from the normal line direction $P_1$. Thus, when the display device is designed so that a large portion of light is gathered within this range and when the viewer looks at the display surface 1a of the liquid crystal display device from a direction close to the normal line direction $P_1$ with respect to the display surface 1a of the liquid crystal display device, the display appears brighter than when the display is viewed from other directions.

The widening and direction of the clear viewing range W can be controlled by adjusting the shapes and direction of arrangement of the recesses 63.

Since the recesses 63 of the reflector 47 used in the embodiment are formed with aspherical surfaces having a single minimum point, changes in the reflection angle of light are smooth, so that the reflected light does not appear too bright at a particular viewing angle.

The range of the maximum inclination angles $\delta_{max}$ of the recesses 63a, 63b, 63c, etc., is from about 2 degrees to about 90 degrees. However, the range is most often from about 4 degrees to about 35 degrees. Therefore, light incident upon the entire surface of each recess 63 is scattered within a wide range and does not cause excessive scattering in one particular direction, so that the field of view as a whole appears bright. When a large amount of light is slanted and reflected within a particular viewing angle (that is, in a direction within the range of angles less than about 30 degrees from the normal line direction $P_1$, in particular, in a direction within the range of about 20 degrees from the normal line direction $P_1$), and when the display is viewed within the viewing angle (that is, when the display is viewed from a practical viewing point, in particular, when it is viewed when the angle between the normal line direction and the main viewing direction is from about 0 degrees to about 20 degrees), the display appears particularly bright.

Since the depth of each recess 63 is set irregularly so as to fall within the range of from about 0.1 μm to about 3 μm, and the recesses 63 are disposed irregularly adjacent each other, moiré patterns are not produced when they are formed in the reflective liquid crystal display device, and the peak value of the amount of reflected light occurs within a larger range of viewing angles, so that changes in the amount of reflected light within the field of view becomes smooth.

The reflector 47 is mounted so that the direction of the side portions A including the maximum inclination angles of the corresponding recesses 63a, 63b, 63c, etc., are at the far side (Y direction) from the viewing point $Ob_1$.

The transparent electrode layers 15 and 25, which sandwich the liquid crystal layer 30, are formed of stripe-shaped portions that are perpendicular to each other in order to form a simple matrix liquid crystal device in which areas where intersection points of the stripe-shaped portions are disposed form pixels.

In the reflective liquid crystal display device 3 of the embodiment, when outside light is incident upon the display surface 1a, the incident light enters the inside of the liquid crystal panel 35b and passes through each layer thereof to reach the surface of the reflector 47. The incident light is reflected at a wide angle by the curved surfaces of the recesses 63a, 63b, 63c, etc., of the reflector 47, passes through each of the layers again, and exits from the display surface 1a. Since the exiting light is scattered within a wide viewing angle range, the display surface 1a can be viewed from a wide viewing angle without the light source appearing on the display surface 1a. However, when the viewer looks at the display surface 1a from the direction of the viewing point $Ob_1$ that is opposite to the orientation direction Y, in particular, when the viewer looks at the display surface 1a when the angle between the normal line direction $P_1$ and the main viewing direction $α_1$ is from about 0 degrees to about 20 degrees, the brightness of the screen becomes a maximum.

In the reflective liquid crystal display device 3 of the embodiment, by providing the reflector 47 with a plurality of recesses 63 having the above-described structure, the peak value of the reflection ratio of light incident upon the liquid crystal cell 35b and reflected by the reflector 47 is set so as to occur within the range of angles less than about 30 degrees from the normal line direction $P_1$. In the reflection mode, the amount of reflected light within the range of angles less than about 30 degrees from the normal line direction $P_1$ with respect to the display surface 1a of the liquid crystal display device 3 becomes large, so that the distribution of the amount of reflected light in a direction close to the viewing point $Ob_1$ of the viewer becomes large. Accordingly, at a practical viewing point, particularly when the angle $θ_1$ between the main viewing direction $α_1$ and the normal line direction $P_1$ lies in the range of from about 0 to about 20 degrees, the liquid crystal display device can provide a bright display (screen).

In particular, in the liquid crystal display device in which the peak value of the reflection ratio of light incident upon the liquid crystal cell 35b and reflected by the reflector 47 is set so as to occur in the range of about 20 degrees from the normal line direction $P_1$, the amount of light reflected within the range of about 20 degrees from the normal line direction $P_1$ with respect to the display surface 1a of the liquid crystal display device 3 in the reflection mode becomes large, so that the distribution of the amount of reflected light in a direction close to the viewing point $Ob_1$ of the viewer becomes large. In addition, an area where the amount of reflected light is large is widened. Accordingly, at a practical viewing point, particularly when the angle $θ_1$ between the main viewing direction $α_1$ and the normal line direction $P_1$ lies in the range of from about 0 to about 20 degrees, the liquid crystal display device can provide a bright display (screen).

In the reflective liquid crystal display device 3 shown in FIG. 5, the reflector 47 is formed as a layer that is separate from the electrode layer 15. When the electrode layer 15 is formed by the reflector 47 and at the location where the reflector 47 is disposed in FIG. 5, the transparent electrode layer 15 can function as a reflector, thereby simplifying the layered structure of the reflective liquid crystal display device 3.

Although the liquid crystal display device of the third embodiment is described as being an internal attachment type in which the reflector 47 for reflecting outside light incident thereupon is incorporated between the substrates 10 and 20, it may be an external attachment type in which a reflector is provided outwardly of two substrates that sandwich a liquid crystal layer.

Although the liquid crystal display device of the third embodiment of the present invention is described as being a reflective liquid crystal display device, it may be a transflective liquid crystal display device. In that case, the thickness of the reflector 47 is in the range of from about 8 nm to about 50 nm (80 Å to 500 Å), desirably in the range of from about 8 nm to about 30 nm (80 Å to 300 Å), and more desirably in the range of from about 8 nm to about 20 nm (80 Å to 200 Å). In addition, a backlight is provided at the outside surface side of the first substrate 10.

Although the display device of the third embodiment is described as being a simple matrix reflective liquid crystal display device, it may be, for example, an active matrix liquid crystal display device using a thin-film transistor or a thin-film diode, or a segment liquid crystal display device. These types of liquid crystal display devices are included in the present invention.

Although, in the first to third embodiments, one retardation plate is provided between the second substrate 20 and the polarizing plate 28, a plurality of retardation plates may be provided.

Figure 11:
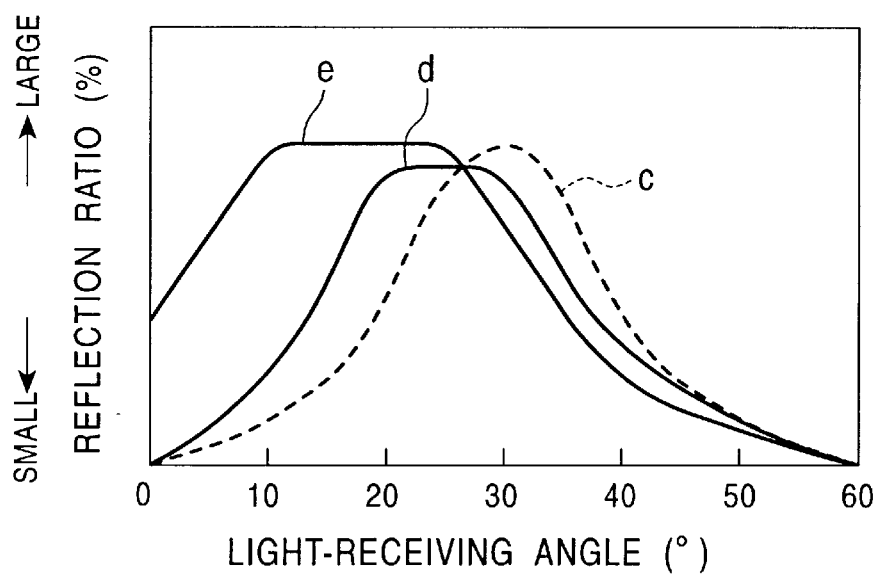
FIG. 11 is a graph showing the relationship between light-receiving angle and reflection ratio of the liquid crystal display device of the embodiment and that of a comparative-example liquid crystal display device.

FIG. 11 illustrates the relationship between light-receiving angle (°) and brightness (reflection ratio) when the display surface 1a of the reflective liquid crystal display device 3 of the third embodiment is irradiated with outside light at an incidence angle of about 30 degrees (that is, an angle made by the optical axis of the outside light that illuminates the display surface 1a from a side opposite to the viewing point $Ob_1$ of the viewer viewing the display from one side of a line perpendicular to the display surface 1a (normal line)), and when the viewing direction a (light receiving angle) is swung up to 60 degrees from the perpendicular line position (normal line position) of 0 degrees. In FIG. 11, solid lines d and e show the relationships between the light receiving angle and the reflection ratio of the reflective liquid crystal display device of the third embodiment. The solid lines d and e are obtained when shapes, arrangement direction, and the like of the recesses 63 of the reflector 47 are varied.

In FIG. 11, as a comparative example, the relationship between the light-receiving angle and the reflection ratio of the related liquid crystal display device shown in FIG. 12 or 13 that does not use a backlight is indicated by a broken line c.

As is clear from FIG. 11, in the liquid crystal display device of the comparative example, the peak reflection ratio value occurs at the specular reflection angle (light-receiving angle of about 30 degrees). When the light-receiving angle becomes less than about 20 degrees, the reflection ratio is greatly reduced. Therefore, although the display appears bright when viewed from the specular reflection direction, the display appears dark when viewed from other directions.

In contrast, in the liquid crystal display device of the third embodiment having the property represented by the solid line d, the reflection ratio peak value exits within the range of angles less than about 30 degrees from the normal line direction (light-receiving angle of 0 degrees), and a particularly high reflection ratio peak value area centered on the light-receiving angle of approximately 25 degrees exists. Therefore, compared to the comparative example, the reflection ratio is higher in the light-receiving angles of from about 0 to about 30 degrees. Consequently, when the viewer looks at the display from a direction close to the normal line direction, the display appears brighter than in the comparative example. In the liquid crystal display device of the third embodiment having the property represented by the solid line e, the reflection ratio peak value exists within the range of about 20 degrees from the normal line direction (light-receiving angle of 0 degrees), and a particularly high reflection ratio peak value area centered on the light-receiving angle of approximately 15 degrees exists. Therefore, compared to the comparative example, the reflection ratio is higher in the light-receiving angles of from about 0 to about 27 degrees. Consequently, when the viewer looks at the display from a direction close to the normal line direction, the display appears brighter than in the comparative example.

In addition, in the embodiments of solid lines d and e the reflection ratio is substantially constant over a range of about 10 degrees (from about 20 degrees to about 30 degrees) and 15 degrees respectively (from about 10 degrees to about 25 degrees). The range of substantially constant reflection ratio of the embodiments of solid lines d and e are larger that that of comparative example c, while the maximum reflection ratio is about the same as that of comparative example c due to the asymmetric nature of the recesses. Thus, while there may not be much change in maximum brightness compared with comparative example c, the maximum brightness of the embodiments of solid lines d and e occur at a more useful angle to the typical user (peak of c) than comparative example c. Furthermore, the embodiments of solid lines d and e are brighter than comparative example c over a broader and more useful range of typically used viewing angles (as shown about 0 to about 27 degrees).

In all embodiments (solid lines a, b, d, or e), the range of substantially constant reflection ratio is not less than about 10 degrees to provide an adequate set of viewing angles of equal brightness for the viewer.

For this reason, when the liquid crystal display device of the embodiment having any of the above-described structures is incorporated in a display section of a portable electronic apparatus, such as a cellular phone or a notebook-size personal computer, the visibility is, in particular, good.

As described in detail above, according to any one of the above-described liquid crystal display devices of the present invention, in the case where the angle between the main viewing direction and the direction of the normal line with respect to the display surface of the liquid crystal display device is from about 0 degrees to about 20 degrees, when the reflection ratio peak value of light incident upon the liquid crystal display device and reflected by the reflector is set so as to occur within the range of about 30 degrees from the normal line direction, desirably, within the range of about 20 degrees from the normal line direction, the liquid crystal display device has a viewing angle property that causes the display to appear brighter when the viewer views the display from a direction close to the direction of the normal line with respect to the display surface of the liquid crystal display device than when the viewer views it from other viewing angle directions.

According to any one of the above-described liquid crystal display devices of the present invention, in the case where the angle between the main viewing direction and the direction of the normal line with respect to the display surface of the liquid crystal display device is from about 0 degrees to about 20 degrees, when the reflection ratio peak value of light incident upon the liquid crystal display device and reflected by the reflector is set so as to occur within the range of angles less than about 30 degrees from the normal line direction, desirably, within the range of about 20 degrees from the normal line direction, the liquid crystal display device has a viewing angle property that causes the display to appear brighter when the viewer looks at the display from a direction close to the direction of the normal line with respect to the display surface of the liquid crystal display device than when the viewer looks at it from other viewing angle directions.

According to a portable electronic device of the present invention, a liquid crystal display device of the present invention having any one of the above-described structures is provided at its display section. Therefore, a portable electronic apparatus, such as a cellular phone or a notebook-size personal computer, including a display surface (screen) having excellent visibility in the reflection mode or in either the reflection mode or the transmission mode of operation can be provided.

What is claimed is:

1. A liquid crystal display device comprising:
   a liquid crystal cell including a first transparent substrate, a second transparent substrate, a first electrode disposed on an inside surface side of the first substrate, and a first alignment film disposed on an opposite side of the first electrode as a side opposing the first transparent substrate, a second electrode disposed on an inside surface side of the second substrate, and a second alignment film disposed on an opposite side of the second electrode as a side opposing the second substrate, and a liquid crystal layer sandwiched between the first substrate and the second substrate;

a reflector disposed one of at an outside surface side of the first transparent substrate and between the first transparent substrate and the first electrode; and a retardation plate and a polarizing plate disposed in that order from an outside surface side of the second substrate, wherein, when an angle between a direction of a normal line with respect to a display surface of the liquid crystal display device and a main viewing direction is from about 0 degrees to about 20 degrees, a reflection ratio peak value of light incident upon the liquid crystal display device and reflected by the reflector is set so as to occur within a range of about 30 degrees from the normal line direction.

2. A liquid crystal display device according to claim 1, wherein the reflection ratio peak value of the light incident upon the liquid crystal display device and reflected by the reflector is set so as to occur within a range of about 20 degrees from the normal line direction.

3. A liquid crystal display device according to claim 2, wherein the reflector includes a plurality of recesses with light reflectivity formed in one of a surface of a base material and a metallic film formed on the base material, the recesses having inside surfaces which form parts of spherical surfaces and an inclination angle distribution in a range of from about −30 degrees to about +30 degrees, the recesses being formed irregularly so as to have depths within a range of from about 0.1 µm to about 3 µm, and the recesses being disposed irregularly so that pitches between adjacent recesses are in a range of from about 5 µm to about 50 µm.

4. A liquid crystal display device according to claim 2, wherein a thickness of the one of the base material and the metallic film of the reflector is in a range of from about 8 nm to about 20 nm.

5. A liquid crystal display device according to claim 1, wherein the reflector includes a plurality of recesses with light reflectivity formed in one of a surface of a base material and a metallic film formed on the base material, the recesses having inside surfaces which form parts of spherical surfaces and an inclination angle distribution in a range of from −about 30 degrees to +about 30 degrees, the recesses being formed irregularly so as to have depths within a range of from about 0.1 µm to about 3 µm, and the recesses being disposed irregularly so that pitches between adjacent recesses are in a range of from about 5 µm to about 50 µm.

6. A portable electronic apparatus comprising the liquid crystal display device of claim 1 at a display section thereof.

7. A liquid crystal display device according to claim 1, wherein the reflection ratio peak value of the light incident upon the liquid crystal display device and reflected by the reflector is substantially constant between a range of one of about 10 degrees to about 50 degrees and about 20 degrees to about 40 degrees from the normal line direction.

8. A liquid crystal display device according to claim 1, further comprising a backlight disposed more distal to the liquid crystal layer than the first transparent substrate.

9. A liquid crystal display device according to claim 1, wherein the reflection ratio peak value of the light incident upon the liquid crystal display device and reflected by the reflector is substantially constant over a range of not less than about 10 degrees.

10. A liquid crystal display device comprising:

a liquid crystal cell including a first transparent substrate, a second transparent substrate, a first electrode disposed on an inside surface side of the first substrate, and a first alignment film disposed on an opposite side of the first electrode as a side opposing the first transparent substrate, a second electrode disposed on an inside surface side of the second substrate, and a second alignment film disposed on an opposite side of the second electrode as a side opposing the second substrate, and a liquid crystal layer sandwiched between the first substrate and the second substrate;

a reflector disposed one of at an outside surface side of the first substrate and between the first substrate and the first electrode; and a retardation plate and a polarizing plate disposed in that order from at an outside surface side of the second substrate, wherein, when an angle between a direction of a normal line with respect to a display surface of the liquid crystal display device and a main viewing direction is from about 0 degrees to about 20 degrees, a reflection ratio peak value of light incident upon the liquid crystal display device and reflected by the reflector is set so as to occur within a range of angles less than about 30 degrees from the normal line direction.

11. A liquid crystal display device according to claim 10, wherein the reflection ratio peak value of the light incident upon the liquid crystal display device and reflected by the reflector is set so as to occur within a range of about 20 degrees from the normal line direction.

12. A liquid crystal display device according to claim 10, wherein the reflector includes a plurality of recesses with light reflectivity formed in one of a surface of a base material and a metallic film formed on the base material, each of the recesses being formed so that an inclination angle (absolute value of an angle between the base material surface and a tangential plane at any point on a curvature) at each one of a corresponding side portion becomes a maximum, the recesses being formed irregularly so as to have depths within a range of from about 0.1 µm to about 3 µm, and the recesses being disposed irregularly so that pitches between adjacent recesses are in a range of from about 5 µm to about 50 µm.

13. A liquid crystal display device according to claim 12, wherein a thickness of the one of the base material and the metallic film of the reflector is in a range of from about 8 nm to about 20 nm.

14. A portable electronic apparatus comprising the liquid crystal display device of claim 10 at a display section thereof.

15. A liquid crystal display device according to claim 10, wherein the reflection ratio peak value of the light incident upon the liquid crystal display device and reflected by the reflector is substantially constant between a range of one of about 20 degrees to about 30 degrees and about 10 degrees to about 25 degrees from the normal line direction.

16. A liquid crystal display device according to claim 10, wherein the reflector includes a plurality of aspherical recesses with light reflectivity formed in one of a surface of a base material and a metallic film formed on the base material.

17. A liquid crystal display device according to claim 16, wherein each of the recesses have a maximum inclination angle (an absolute value of an angle between a surface of the base material and a tangential plane at any point on a curvature) that differ irregularly and have values within a range of from about 2 degrees to about 90 degrees, the recesses are formed irregularly and have depths (a distance between a minimum point of each recess and the surface of the base material) within a range of from about 0.1 μm to about 3 μm, and the recesses are disposed irregularly such that pitches between adjacent recesses are in a range of from about 5 μm to about 50 μm.

18. A liquid crystal display device according to claim 17, wherein the maximum inclination angles of a majority of the recesses have values within a range of from about 4 degrees to about 35 degrees.

19. A liquid crystal display device according to claim 17, wherein the recesses have a single minimum point.

20. A liquid crystal display device according to claim 10, further comprising a backlight disposed more distal to the liquid crystal layer than the first transparent substrate.

21. A liquid crystal display device according to claim 10, wherein the reflection ratio peak value of the light incident upon the liquid crystal display device and reflected by the reflector is substantially constant over a range of not less than about 10 degrees.

22. A method of improving viewing of a liquid crystal display device having a reflector and a display surface, the method comprising setting a reflection ratio peak value of light incident upon the liquid crystal display device and reflected by the reflector to occur within a range of less than about 20 degrees from a direction of a normal line with respect to the display surface when an angle between the normal line direction and a main viewing direction of the display surface is about 0 degrees to about 20 degrees; and broadening the reflection ratio peak value to be substantially constant over a range of not less than about 10 degrees.

23. The method according to claim 22, further comprising providing a plurality of asymmetric recesses in the reflector.

24. A method according to claim 22, further comprising providing a thickness of material in which the recesses are formed in a range of from about 8 nm to about 20 nm.

25. A method according to claim 22, further comprising providing recesses: that have a maximum inclination angle (an absolute value of an angle between a surface of material in which the recesses are formed and a tangential plane at any point on a curvature) that differs irregularly and has a value within a range of from about 2 degrees to about 90 degrees, that are formed irregularly and have depths (a distance between a minimum point of each recess and the surface of the base material) within a range of from about 0.1 μm to about 3 μm, and that are disposed irregularly such that pitches between adjacent recesses are in a range of from about 5 μm to about 50 μm.

26. A method according to claim 25, further comprising providing recesses in which the maximum inclination angles of a majority of the recesses have values within a range of from about 4 degrees to about 35 degrees.

27. A method according to claim 25, further comprising providing recesses that have a single minimum point.

28. A method according to claim 22, further comprising providing a backlight more distal to a viewer than the reflector that supplies light to the reflector.

29. A method of providing a portable electronic apparatus comprising the method of claim 22.

* * * * *

UNITED STATES PATENT AND TRADEMARK OFFICE
CERTIFICATE OF CORRECTION

PATENT NO. : 6,606,139 B2
DATED : August 12, 2003
INVENTOR(S) : Katsumasa Yoshii et al.

It is certified that error appears in the above-identified patent and that said Letters Patent is hereby corrected as shown below:

<u>Column 21,</u>
Line 37, delete "claim 2," and substitute -- claim 3, -- in its place.

Signed and Sealed this

Seventeenth Day of February, 2004

JON W. DUDAS
*Acting Director of the United States Patent and Trademark Office*